(12) United States Patent
Ng-Thow-Hing et al.

(10) Patent No.: US 9,135,754 B2
(45) Date of Patent: Sep. 15, 2015

(54) METHOD TO GENERATE VIRTUAL DISPLAY SURFACES FROM VIDEO IMAGERY OF ROAD BASED SCENERY

(71) Applicants: Victor Ng-Thow-Hing, Sunnyvale, CA (US); Srinath Sridhar, Saarbrücken (DE)

(72) Inventors: Victor Ng-Thow-Hing, Sunnyvale, CA (US); Srinath Sridhar, Saarbrücken (DE)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 13/887,155

(22) Filed: May 3, 2013

(65) Prior Publication Data

US 2013/0293582 A1 Nov. 7, 2013

Related U.S. Application Data

(60) Provisional application No. 61/643,792, filed on May 7, 2012.

(51) Int. Cl.
*G09G 5/00* (2006.01)
*G06T 19/00* (2011.01)
*G06T 17/00* (2006.01)
*B60R 1/00* (2006.01)
*G06T 7/00* (2006.01)

(52) U.S. Cl.
CPC .............. *G06T 19/006* (2013.01); *B60R 1/00* (2013.01); *G06T 7/0042* (2013.01); *G06T 17/00* (2013.01); *B60R 2300/305* (2013.01); *G06T 2207/10016* (2013.01); *G06T 2207/20061* (2013.01); *G06T 2207/30256* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 6,195,099 B1 * | 2/2001 | Gardiner | 345/426 |
| 7,167,779 B2 | 1/2007 | Kashiwada et al. | |
| 8,108,142 B2 | 1/2012 | Dupont et al. | |
| 2006/0074549 A1 * | 4/2006 | Takahashi et al. | 701/207 |
| 2006/0238379 A1 * | 10/2006 | Kimchi et al. | 340/995.1 |
| 2009/0005961 A1 | 1/2009 | Grabowski et al. | |
| 2010/0070165 A1 * | 3/2010 | Kang | 701/201 |

(Continued)

FOREIGN PATENT DOCUMENTS

JP 2012-006469 A 1/2012

OTHER PUBLICATIONS

Sawano et al., "A Car-navigation System based on Augmented Reality", 2005.*

(Continued)

*Primary Examiner* — David H Chu
(74) *Attorney, Agent, or Firm* — Fenwick & West LLP

(57) ABSTRACT

Generating a virtual model of environment in front of a vehicle based on images captured using an image capturing. The Images captured on an image capturing device of a vehicle are processed to extract features of interest. Based on the extracted features, a virtual model of the environment is constructed. The virtual model includes one or more surfaces. Each of the surfaces may be used as a reference surface to attach and move graphical elements generated to implement augmented reality (AR). As the vehicle moves, the graphical elements move as if the graphical elements are affixed to the one of the surfaces. By presenting the graphical elements to move together with real objects in front of the vehicle, a driver perceives the graphical elements as being part of the actual environment and reduces distraction or confusion associated with the graphical elements.

16 Claims, 8 Drawing Sheets

(56) References Cited

U.S. PATENT DOCUMENTS

| | | | |
|---|---|---|---|
| 2010/0253542 A1* | 10/2010 | Seder et al. | 340/932.2 |
| 2010/0289632 A1 | 11/2010 | Seder et al. | |
| 2010/0292886 A1 | 11/2010 | Seder et al. | |
| 2010/0329513 A1 | 12/2010 | Klefenz | |
| 2011/0026771 A1* | 2/2011 | Hsu et al. | 382/104 |
| 2011/0052042 A1* | 3/2011 | Ben Tzvi | 382/154 |
| 2012/0176410 A1* | 7/2012 | Meier et al. | 345/633 |

OTHER PUBLICATIONS

Aly, M., "Real time Detection of Lane Markers in Urban Streets," *2008 IEEE Intelligent Vehicles Symposium*, Jun. 4-6, 2008, pp. 7-12, Eindhoven, Netherlands.

Fan, H-P. et al., "3D Indoor Virtual Environment Modeling Via Vehicle Navigation and Multi-Camera Image Data Fision", 2000, Department of Computer & Information Science, Tung University, Taiwan, eight pages.

PCT International Search Report and Written Opinion, PCT Application No. PCT/US2013/039557, Nov. 25, 2013, nine pages.

Bertozzi, M., et al., "Real-time lane and obstacle detection on the gold system," IEEE Proceedings in Intelligent Vehicle Symposium, 1996, pp. 213-218.

Doshi, A., et al., "A Novel Active Heads-Up Display for Driver Assistance," IEEE Transactions on Systems, Man, and Cybernetics—Part B: Cybernetics, Feb. 2009, pp. 85-93, vol. 39, No. 1.

Kim, S., et al., "Simulated Augmented Reality Windshield Display as a Cognitive Mapping Aid for Elder Driver Navigation," CHI-Navigation, Apr. 6, 2009, pp. 133-142.

Medenica, Z., et al., "Exploring In-Car Augmented Reality Navigation Aids: A Pilot Study," UbiComp, 2009, 2 Pages.

MVS California LLC, Virtual Cable-Technology, 2011, 21 Pages [online] [retrieved on May 21, 2012] Retrieved from the internet <URL: http://www.mvs.net/technology.html>.

Park, W., "AR app turns iPhone into heads-up display (HUD) for your car—Coolest, yet most pointless app ever," IntoMobile, Aug. 20, 2010, 13 Pages [online] [retrieved on May 24, 2012] Retrieved from the internet <URL: http://www.intomobile.com/2010/08/20/ar-app-turns-iphone-into-heads-up- . . . >.

Poitschke, T., et al., "Contact-analog Information Representation in an Automotive Head-Up Display," ETRA, Mar. 26-28, 2008, pp. 119-122, ACM.

Sridhar, S., et al., "Extraction of Virtual Display Surfaces for In-car Augmented Reality," Dec. 21, 2011, 46 Pages.

Sridhar, S., et al., "Generation of Virtual Display Surfaces for In-vehicle Conformal Augmented Reality," Ismar 2012, 8 Pages.

Wu, W., et al., "A Prototype of Landmark-Based Car Navigation Using a Full-Windshield Head-Up Display System," AMC'09, Oct. 23, 2009, 7 Pages.

\* cited by examiner

METHOD TO GENERATE VIRTUAL DISPLAY SURFACES FROM VIDEO IMAGERY OF ROAD BASED SCENERY

CROSS REFERENCE TO RELATED APPLICATION

This application claims priority under 35 U.S.C. §119(e) to co-pending U.S. Provisional Patent Application No. 61/643,792, filed on May 7, 2012, which is incorporated by reference herein in its entirety.

FIELD OF DISCLOSURE

The present disclosure is related to presenting graphical elements on a display device of a vehicle to implement augmented reality.

BACKGROUND OF DISCLOSURE

A driver of a vehicle is inundated with information from various sensory organs when driving a vehicle. In addition to sounds and vibrations from various sources, the driver also receives a large amount of visual information while driving the vehicle. Sources of such visual information may include external stimuli such as people and buildings on the sides of the street, advertising and infotainment applications in the dash displays. Such sources of visual information may often distract the driver and causing the driver to focus his attention away from the traveling direction of the vehicle.

Augmented reality systems in vehicles are being developed to reduce distractions to the driver while providing visual information to assist in various activities in the vehicles. Augmented reality systems in vehicles may use flat panel display devices (e.g., liquid crystal display (LCD)) installed in a dashboard or console of a vehicle or heads-up display (HUD) that displays graphical elements on a windshield of a vehicle. The augmented reality systems can also enhance safety by enhancing the saliency of road hazards or suggesting safe actions for a particular driving context.

However, augmented reality systems may themselves become a cause of distraction if information is not presented to the driver in an adequate manner. If the graphical elements are too vibrant, inadequately animated or abruptly show up at critical moments, images presented on the display devices in the vehicle may contribute to accidents or unsafe driving rather than enhancing safety. Hence, the graphical elements presented on the vehicle should be designed to reduce the driver's distraction while providing various types of helpful visual information to the driver.

SUMMARY OF THE DISCLOSURE

Embodiments relate to constructing a virtual model using visual features extracted from an image captured by an image capturing device (e.g., a camera) installed in a vehicle. The visual features can be used to determine the position of a road relative to the vehicle. The virtual model includes at least one surface which is referenced to configure and locate graphical elements on a display device. The graphical elements convey information to the driver.

In one embodiment, the display device is a heads-up display projecting the graphical elements on a windshield of the vehicle.

In one embodiment, the virtual model represents a trench including a left wall, a right wall, a ground plane and a sky plane parallel to the ground plane.

In one embodiment, the configured graphical elements move in conjunction with the at least one surface to generate an appearance that the configured graphical elements are fixed to the at least one surface.

In one embodiment, the visual features are detected by cropping the captured image to extract a portion of image including outline of a road, and detecting line features representing edges of the road from the cropped image.

In one embodiment, inverse perspective mapping is performed on the cropped image to generate a bird's eye view image. A separable filter is used on the bird's eye view image to generate a filtered image. The line features are detected from the filtered image. Curve fitting is performed on the detected line features.

In one embodiment, the location and heading of the vehicle are determined. Information is then received from an information source based on the location or heading of the vehicle.

In one embodiment, a profile of a user and the location or heading of the vehicle are used to generate the graphical elements.

In one embodiment, the location of the sun relative to the vehicle is determined based on a current time, the heading of the vehicle and the location of the vehicle. Shadows of at least one of the configured graphical elements are generated based on the location of the sun relative to a position of the vehicle on the Earth's surface and the time of day. The generated shadows are displayed on the display device.

In one embodiment, a pedestrian likely to cross the road in front of the vehicle is detected. A graphical element representing a crosswalk at a portion of the road across which the pedestrian is likely to cross the road is then generated.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the subject matter.

BRIEF DESCRIPTION OF THE DRAWINGS

The teachings of the present disclosure can be readily understood by considering the following detailed description in conjunction with the accompanying drawings.

DETAILED DESCRIPTION OF THE DISCLOSURE

Figure 1:
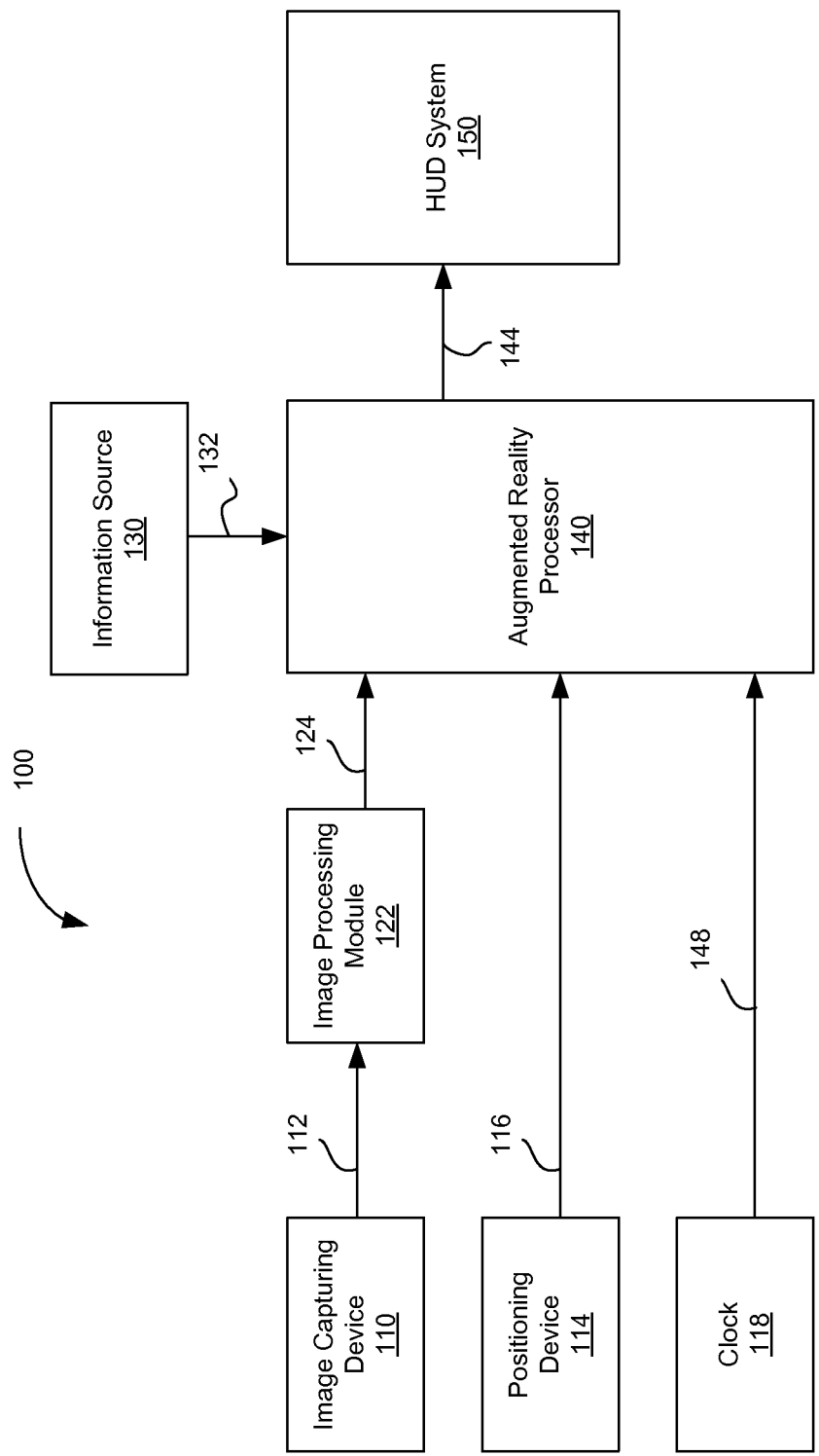
FIG. 1 is a block diagram of an augmented reality system, according to one embodiment.

A preferred embodiment is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the subject matter. Accordingly, the disclosure is intended to be illustrative, but not limiting, of the scope, which is set forth in the following claims.

Embodiments relate to generating a virtual model of environment in front of a vehicle based on images captured using an image capturing device (e.g., a camera). The Images captured on the image capturing device are processed to extract features of interest (e.g., outline of a road). Based on the extracted features, a virtual model of the environment is constructed. The virtual model includes one or more surfaces. Each of the surfaces may be used as a reference surface to attach and move graphical elements generated to implement augmented reality (AR). As the vehicle moves, the graphical elements move as if the graphical elements are affixed to one of the surfaces in the virtual model. By presenting the graphical elements to move together with real objects in front of the vehicle, a driver perceives the graphical elements as being part of the actual environment and reduces distraction or confusion associated with the graphical elements.

The graphical elements described herein refer to visual image components displayed on a display device. The graphical elements may include, but are not limited to, text messages, arrows, icons, animated objects, three-dimensional models, and static or dynamic images. The graphical elements may also include static or dynamic advertisements.

Overview of Augmented Reality System

Figure (FIG. 1 is a block diagram illustrating an augmented reality system 100, according to one embodiment. The augmented reality system 100 detects environment in front of a vehicle and positioning of the vehicle in the environment, and displays virtual objects in a display device of the vehicle in a non-distracting manner. The augmented reality system 100 may include, among other components, an image capturing device 110, an image processing module 122, a positioning device 114, a clock 118, an information source 130, an augmented reality processor 140 and a heads-up display (HUD) system 150.

The image capturing device 110 is a device for capturing an image of environment in front of the vehicle. Preferably, the images captured by the image capturing device closely resembles the images seen by a driver through a windshield. The image capturing device 110 may be located at a location close to the driver to produce such images. The image capturing device 110 may be an RGB camera, a grayscale camera, stereoscopic camera, a depth camera or a combination of thereof. The image capturing device 110 produces processed images 124 that are sent to the image processing module 122 for preprocessing.

The image processing module 122 performs preprocessing on the captured images 112 to facilitate extraction of features at the augmented reality processor 140. The preprocessing performed at the image processing module 122 may include, among others, edge detection and noise filtering.

The positioning device 114 is hardware, software, firmware or a combination thereof for detecting the location and heading of the vehicle. The positioning device 114 may include, for example, a global positioning system (GPS) receiver, a compass, and an inertial sensor. The positioning device 114 may also communicate with other sensors (e.g., an odometer and a vehicle direction sensor) to continue monitoring the location and heading of the vehicle even when GPS signals are not available. The positioning device 114 generates positioning information 116 including the location and the heading of the vehicle to the augmented reality processor 140.

A clock 118 provides time information 148 to the augmented reality processor 140. The time information 148 indicates the current time and may be used to generate shadows of graphical elements, as described below in detail with reference to FIG. 6.

The information source 130 is a device for storing information to be displayed on the HUD system 150. The information source 130 may include more than one vehicle component providing distinct information on the HUD systems 150. The information source 130 may include, for example, an on-board navigation system, a telematics system, a wireless communication system having Internet connectivity, and an entertainment system in the vehicle. The information source 130 sends data 132 to augmented reality processor 140 for processing and generation of graphical elements.

The augmented reality processor 140 processes various types of information and generates graphical elements for display on the HUD system 150. To provide information to the driver in a seamless and non-intrusive manner, the augmented reality processor 140 generates a virtual model of the environment and places the graphical elements on a virtual surface of the virtual model, as described below in detail with reference to FIG. 5. The graphical elements generated by the augmented reality processor 140 are sent to the HUD system 150 as graphical data 144. Example components and functions of the components in the augmented reality processor 140 are described below in detail with reference to FIG. 2.

The HUD system 150 receives the graphical data 144 from the augmented reality processor 140 and projects the graphical elements indicated by the graphical data 144 onto the windshield of the vehicle. In one embodiment, the HUD system 150 is implemented as a volumetric HUD that displays graphical elements at different focal depths. The HUD system 150 may include, among other components, a projector for projecting rendered images, and a windshield for reflecting the projected images towards the driver.

Although the embodiments are described herein primarily with reference to a HUD system, display devices such as liquid crystal display (LCD) device, organic light-emitting diode (OLED) device, plasma display device or other devices may also be used. These display devices may be installed in a dashboard of a vehicle or in a center console area of a vehicle to provide visual information to the driver. Also, a display device projecting an image onto a transparent reflective surface may be used to render an image on a transparent surface.

Example Augmented Reality Processor

Figure 2:
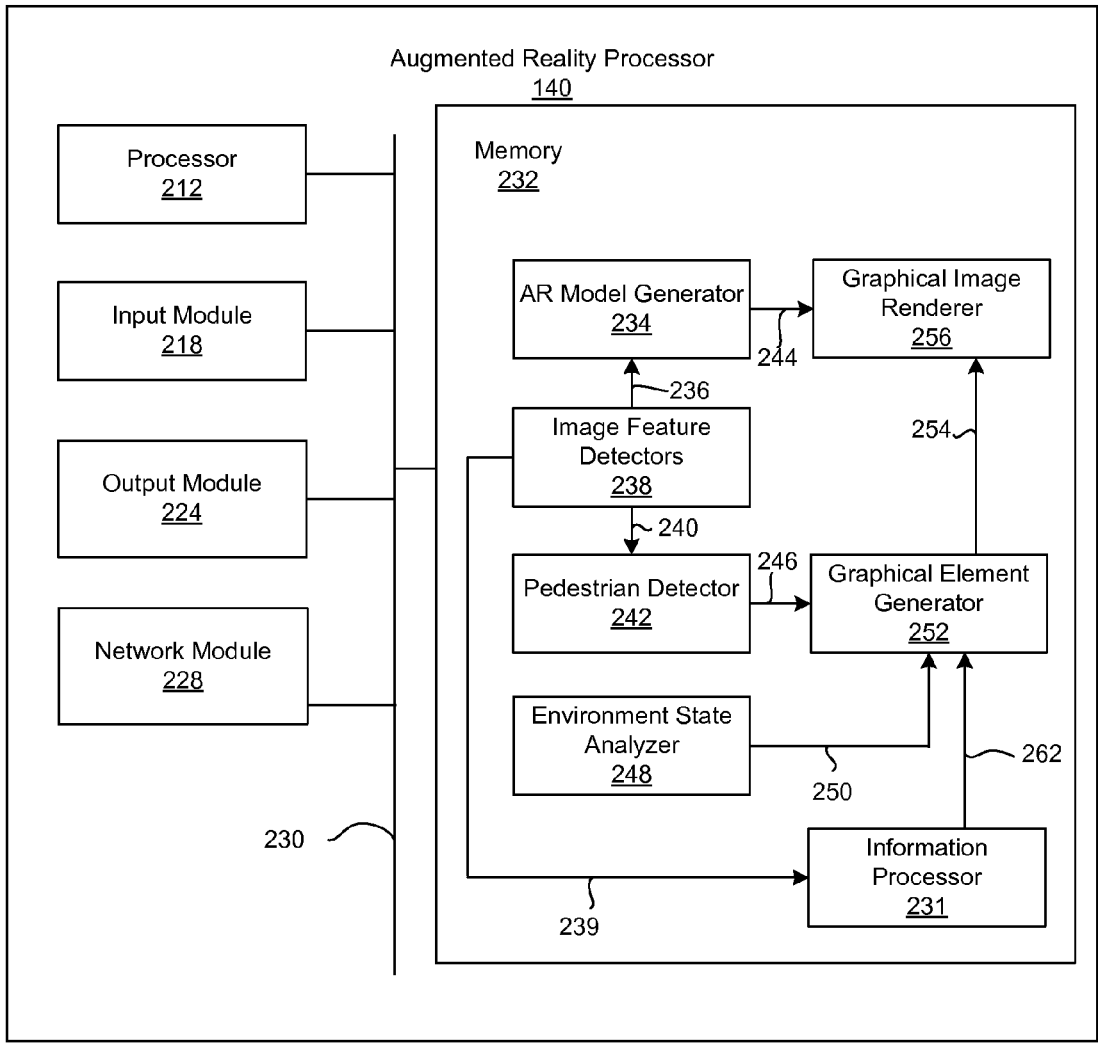
FIG. 2 is a block diagram of an augmented reality processor, according to one embodiment.

FIG. 2 is a block diagram illustrating the augmented reality processor 140, according to one embodiment. The augmented reality processor 140 processes information and generate graphical user elements to be presented on the system 150. The augmented reality processor 140 may include, among other components, a processor 212, an input module 218, an output module 224, a network module 228, memory 232 and a bus 230 connecting these components. The augmented reality processor 140 may include other components not illustrated in FIG. 2, such as a user interface module for receiving user input from a user. The augmented reality processor 140 may be a separate stand-alone device or part of a larger system that also performs operations other than the generation of graphical elements for augmented reality.

The processor 212 is a hardware component that executes instructions stored in memory 232. The input module 218 is a hardware component for receiving information or data from other components (e.g., the input processing module 122) of the augmented reality system 100. The input module 218 may implement communication protocols to ensure proper transmission of data from other components of the augmented reality system 100. The output module 326 is a component for sending the graphical data 144 to the HUD system 150. These components may be embodied in a single integrated circuit (IC) chip or multiple IC chips.

The memory 232 is a non-transitory computer-readable storage medium that stores software components. The software components stored in the memory 232 may include, among other components, an information processor 231, image feature detectors 238, an augmented reality (AR) model generator 234, a pedestrian detector 242, an environment state analyzer 248, a graphical element generator 252 and a graphical image renderer 256. The components may be divided into further software components or more than one of these components may be combined into a single larger software module.

The information processor 231 determines information or messages to be presented to the driver in the form of graphical elements. To provide information relevant to the driver, the information processor 231 may receive a profile of the driver, GPS information of the vehicle, information from social networking services (e.g., FACEBOOK) or other online services, and the information source 130. The profile of the drive may include, for example, age, gender, resident address, log-on information for social networking services, and office address. The information or messages to be presented may include targeted advertisements, street names, names of points of interest (POIs), weather conditions, status of phone calls, contact information, advertisements, and SMS messages or emails received via a communication device. The information processor 231 sends presentation information 262 indicating the information or messages to the graphical element generator 252.

In one embodiment, the information processor 231 determines traffic rules associated with traffic signals or traffic signs detected by the vehicle. The information processor 231 may generate and send graphical elements to indicate warnings to the driver based on traffic signals or traffic signs detected by processing the captured image 112.

The image feature detectors 238 detect predetermined features in the processed images 124. The detected features may include visual features such as lines, edges, ridges and blobs of image pixels. Various computer vision algorithms may be used to detect and extract such features. Example algorithms for such purpose include separable filter algorithms and Hough transform algorithm. Environment image information 236 including extracted visual features related to a road is sent to AR model generator 234, pedestrian image 240 including visual features related to pedestrians is sent to the pedestrian detector 242, and traffic information 239 including visual features related to traffic signals may be sent to the information processor 231.

In one embodiment, the image feature detectors 238 detects visual features relevant to various objections in the environment, including, but not limited to, a road, a pedestrian, traffic signs and traffic signals. Visual features related to the road may include, for example, lines representing edges of the road, blobs of continuous pixels in certain color space, road markings or any fixed visible features on the road. Visual features related to a pedestrian may include blobs of pixels satisfying certain criteria. Visual features related to the traffic signs and traffic signals may include color information of pixels appearing in certain locations of the captured image.

The AR model generator 234 receives the environment image information 236 to construct a virtual model representing the environment in front of the vehicle. Line features in the processed images 124 may be used to determine the configuration of the road, as described below in detail with reference to FIGS. 3 through 4C. The configuration of the road may indicate, for example, the orientation and location of the road relative to the vehicle, the width of the road, and the depth of the road. In one embodiment, the AR model generator 234 generates a virtual model in the form of a trench, as described below in detail with reference to FIG. 5. The AR model generator 234 sends model information 244 indicating the configuration of the virtual model to the graphical image renderer 256.

The pedestrian detector 242 receives the pedestrian image 240 from the image feature detectors 238 to identify pedestrians in the processed image 124. The pedestrian detector 242 also selects pedestrians matching certain criteria. The criteria may indicate any risks to the pedestrian or the vehicle, such as likelihood of collision with the pedestrian and cues on whether a pedestrian is likely to start crossing the road (e.g., a pedestrian facing the road and/or moving towards the road). The location and other information about such selected pedestrians are sent to the graphical element generator 252 as pedestrian information 246.

The environment state analyzer 248 receives the time information 148 and the positioning information 116 to determine the orientation of the sun relative to the vehicle. The environment state analyzer 248 analyzes the time information 148, and the heading of the vehicle to determine the location of the sun relative to the vehicle. Then the orientation and length of a shadow to be included in the graphical elements can be determined to provide more realistic appearance of the graphical elements. The environment state analyzer 248 generates state information 250 as a result of the analysis and sends the state information 250 to the graphical element generator 252.

The graphical element generator 252 generates graphical elements 254 based on the pedestrian information 246, the state information 250, the presentation information 262 and/or other information and data received from other components of the augmented reality system 100. The graphical elements may include, for example, icons indicating warning signals, static or dynamic images, and text messages. The generated graphical elements may also include a virtual crosswalk, as described below in detail with reference to FIGS. 8A and 8B. In one embodiment, the graphical elements may include shadows of the graphical elements based on the time of the day, and the heading of the vehicle. The generated graphical elements 254 are sent to the graphical image renderer 256.

The graphical image renderer 256 configures the received graphical elements 254 to be displayed on the HUD device system (or other display devices) based on the model information 244. At least some of the graphical elements are configured for placement on virtual surfaces of the virtual model. Specifically, at least some of the graphical elements may be dynamically positioned and configured so that these graphical elements are displayed on the display devices as if these graphical elements are part of the real environment. The graphical image renderer 256 includes the graphical elements and their configuration in the graphical data 144 and sends the graphical data 144 to the HUD system 150 via the bus 230 and the output module 224.

Construction of Virtual Model Based On Visual Information

Using visual information available from images captured from an image capturing device (e.g., RGB camera, stereoscopic camera or depth camera) enables expeditious construction of a virtual model of the environment. The visual information may be available from an image capturing device installed on a vehicle. Such visual information may be processed using computer vision algorithms to extract features relevant to construction of a virtual model without extensive computation, delay of time or extensive amount of data from an external source compared to construction of a virtual model relying heavily on map data.

Figure 3:
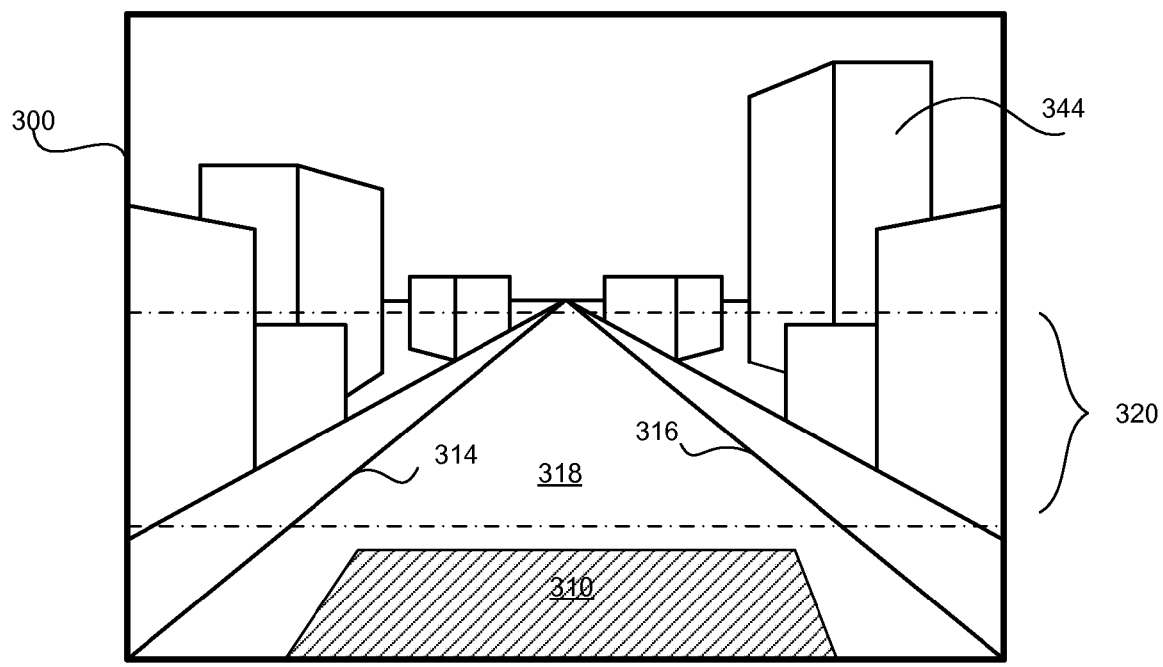
FIG. 3 is a processed version of an image captured by an image capturing device of the augmented reality system, according to one embodiment.

FIG. 3 is a processed version 300 of an image captured by an image capturing device of the augmented reality system, according to one embodiment. The image 300 is captured by the image capturing device pointing toward the front of the vehicle. The image 300 includes lines 314, 316 indicating edges of road 318, building 344 and other objects forming the environment in front of the vehicle. Other processed images are likely to include lane lines that may also be used for processing.

The image feature detectors 238 first selects and crops the portion 320 of the processed image 300 for further processing. The portion of image 300 for further processing is also referred to as region of interest (ROI). The selected portion 320 may extend vertically downwards to a certain distance from a vertical location near the horizon. The selected portion preferably excludes portions of the image that may interfere with accurate detection of features relevant to the road, such as hood 310 of vehicle. The vertical location and the distance of the portion 320 may be preset or may change dynamically with the change of scenery.

Figure 4A:
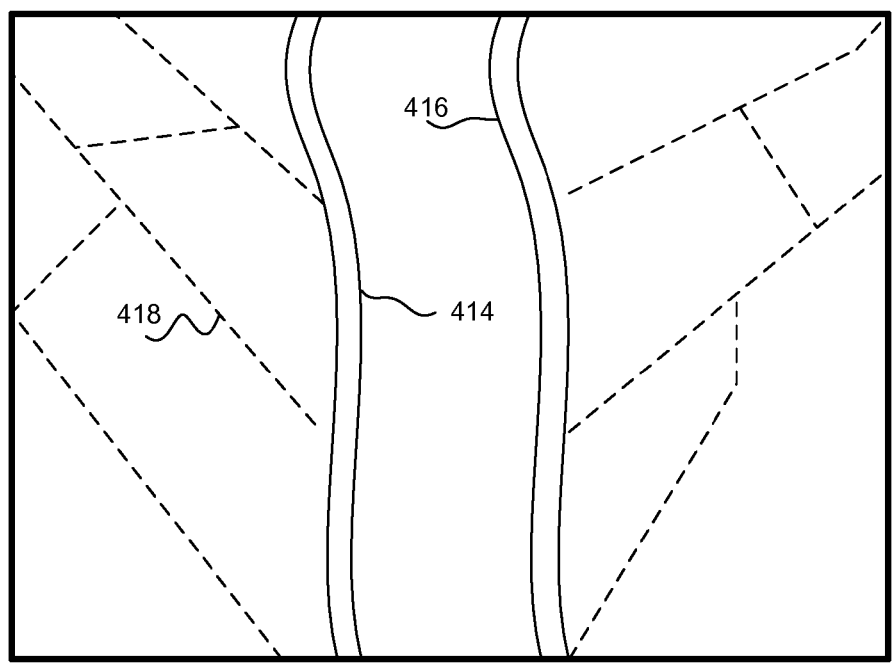
FIG. 4A is a processed image illustrating a portion of the image captured by an image capturing device processed by inverse perspective mapping, according to one embodiment.

FIG. 4A is a processed image illustrating a portion 320 of the processed image 300 processed by inverse perspective mapping (IPM), according to one embodiment. By performing IPM processing, the perspective view of the processed image 300 is converted into a two-dimensional bird's-eye view, as described, for example in, M. Bertozzi et al., "Real-time lane and obstacle detection on the gold system," In Intelligent Vehicle Symposium, Proceedings for the 1996 IEEE, pp. 213-218, (1996), which is incorporated by reference herein in its entirety. Various image artifacts 418 shown by dashed lines and the edges 414, 416 of the road 318 are included in FIG. 4A. The IPM removes the perspective distortion from the image so that road edges and lanes that appear to converge on the original image become parallel in the transformed image.

Figure 4B:
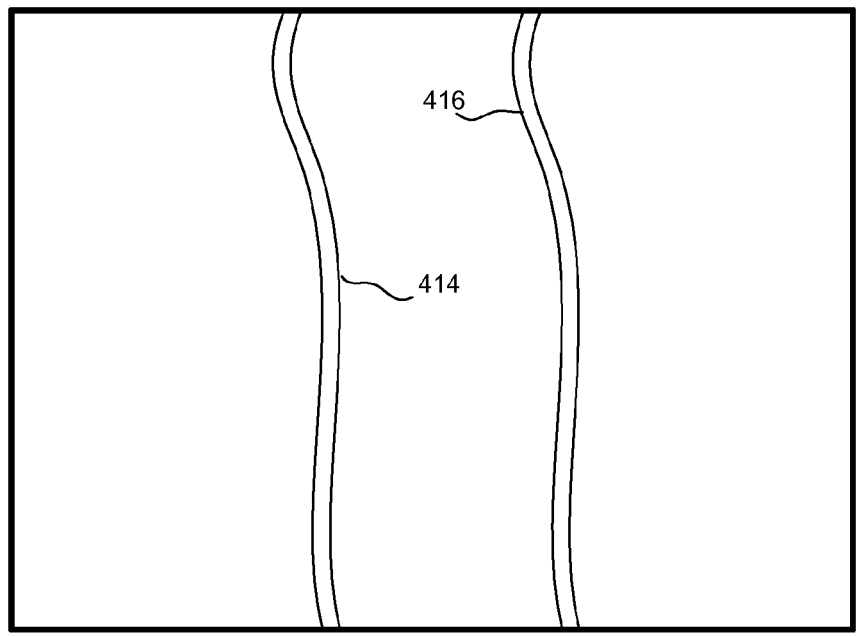
FIG. 4B is a filtered image processed using a separable filter according to one embodiment.

FIG. 4B is a filtered image obtained by applying a separable filter on the image of FIG. 4A, according to one embodiment. The separable filter may be configured to detect line features that are vertically oriented with a tolerable horizontal deviance. By applying the separable filter, artifacts or features 418 in FIG. 4A irrelevant to construction of a virtual model is removed, leaving the edges 414, 416 of the road 138. Using the separable filter to remove artifacts or irrelevant features is advantageous, among other reasons, since the processing can be performed expediently compared to other algorithms. In other embodiments, image processing algorithms other than the separable filter such as Hough transform may be used to extract features of the road.

After obtaining the edges 414, 416 of the road, a curve fitting may be performed to represent the edges of the road. To form a virtual model, the edges 414, 416 are fitted to spline curves. Other fitting mechanism may also be used. The area between the two fitted spline curves represents the road 318 lying ahead of the vehicle.

Figure 4C:
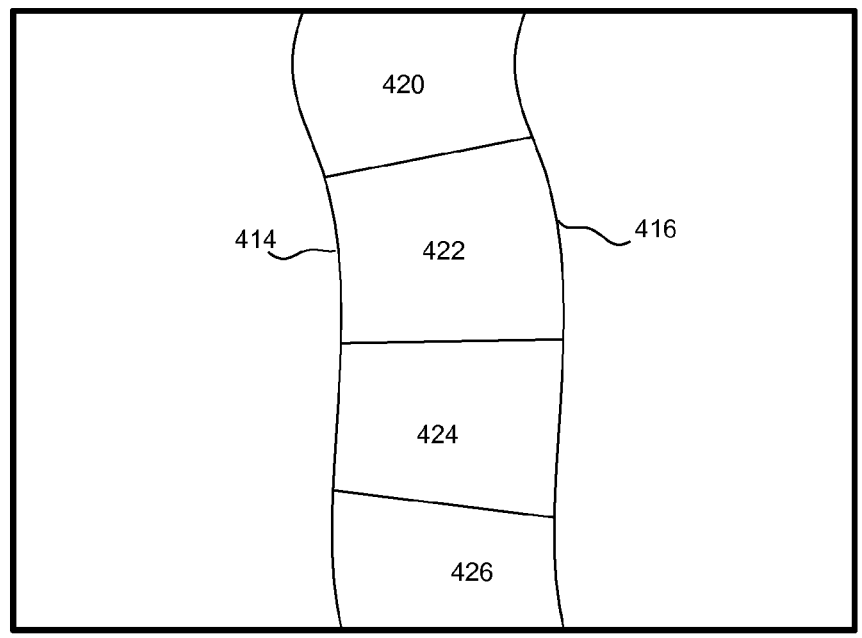
FIG. 4C is a diagram illustrating segmenting of a portion of image detected as a road into multiple segments for modeling, according to one embodiment.

FIG. 4C is a diagram illustrating segmenting a portion of image detected as a road into multiple segments 420, 422, 424, 428 for modeling, according to one embodiment. For each of the segments 420, 422, 424, 428, a separate virtual model of the environment is created. Each virtual model may have a different configuration (e.g., orientation and width). In one embodiment, the road is segmented by a predetermined interval. In other embodiments, the road may be segmented based on changes in the curvature or orientation of curves 414, 416 or other factors.

By segmenting the road into multiple segments and constructing a virtual model for each segment, the virtual models may represent more realistic version of the environment. As the vehicle moves forward, segments 420, 422, 424, 428 move downward, causing a new segment to appear at the top of the image and the segment closest to the bottom (e.g., segment 426) to disappear below the image. The segments may be updated with new configurations as newly captured images of the road are received and processed. After the configurations of each segments are determined, the image feature detectors 238 sends the information about the configurations in the environment image information 236 and sends it to the AR model generator 234.

Figure 5:
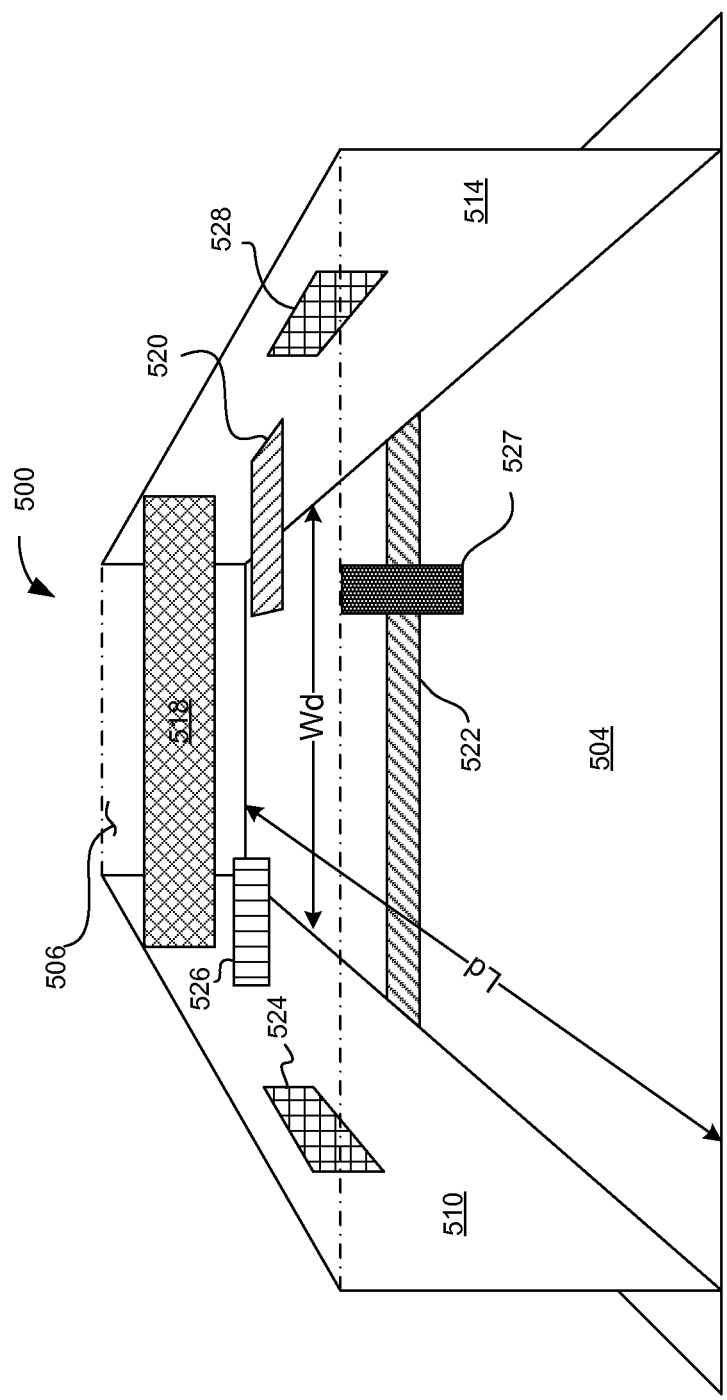
FIG. 5 is a conceptual diagram of a virtual model for a segment of a road, according to one embodiment.

FIG. 5 is a conceptual diagram of a virtual model 500 for a segment of a road, according to one embodiment. The virtual model 500 is in the form of a trench with four surfaces: a floor 504, a left wall 510, a right wall 514 and a ceiling 506. Taking the example of the segment 426 of FIG. 4, the width Wd of the virtual model 500 corresponds to the horizontal distance between curves 414, 416 in the segment 426, and the length Ld of the virtual model 500 corresponds to the vertical length of the segment 426. As the vehicle proceeds forward, the virtual model 500 is moved towards the vehicle and is replaced by another virtual model corresponding to the next segment (e.g., segment 424) as the virtual model 500 comes to an end.

In one embodiment, Kalman filter is applied to the parameters (e.g., the width, the orientation and the coordinates) of the virtual model to achieve smooth transition or movement of virtual models as subsequent processed images 124 are received and processed by the augmented reality processor 140.

In one embodiment, the following assumption may be made to render a virtual model robustly based on the captured image 112: (i) the road in front of the vehicle is flat, (ii) there is no clockwise or counterclockwise roll of the camera, and (iii) the image capturing device 110 is placed at a fixed height from the ground. Additional assumptions may be added to facility the generation of the virtual model based on the captured image 112.

Figure 7:
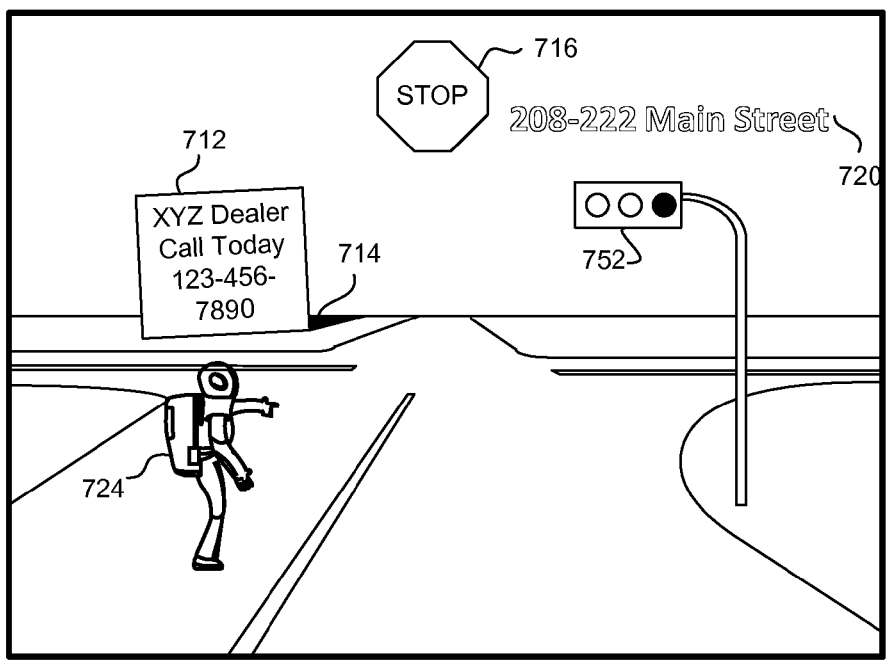
FIG. 7 is an image of augmented reality including graphical elements displayed while the vehicle is stopped at an intersection, according to one embodiment.

Graphical elements for display may be presented in various manners with reference to the surfaces of the virtual model 500. Examples of using the side surfaces as reference surfaces include: (i) using side walls 510, 514 to which the graphical elements are plastered, as illustrated by boxes 524, 528, (ii) hanging a signboard 526 extending inwards (or outwards) from either side wall 510, 514, and (iii) placing a banner 518 extending between the two side walls 510, 514. The ceiling 506 may also be used as a reference surface for placing a label 520 or hanging a sign 527. An example of using the floor 504 as a reference surface for the graphical elements includes placing floor label 522 on the floor 504. Other graphical elements such as billboard or virtual character (e.g., three dimensional animated character 724 as illustrated in FIG. 7) may also use the floor 504 as the reference surface for placement.

The graphical elements move in the same direction and speed as the reference surfaces associated with the graphical elements to give appearance that the graphical elements are part of actual environment. In one embodiment, graphical elements are displayed only for a virtual model corresponding to a segment of the road that is closest to the vehicle. In other embodiments, the graphical elements are displayed for virtual models corresponding two or more segments of the road.

In one embodiment, multiple virtual models are constructed based on the configuration of the road. For a straight road segment, a straight trench virtual model as described above with reference to FIG. 5 may be used. For a segment of a road including an intersection, a virtual model representing two intersecting trenches may be used. By using more than one virtual model, a more realistic virtual model resembling the actual real environment may be created.

Rendering of Graphical Elements

After a virtual model is created, parameters of the virtual model are sent to the graphical image renderer 256 as the model information 244. The graphical image renderer 256 receives the graphical elements 254 and their configurations for presentation from the graphical element generator 252. Based on the virtual model, the graphical image renderer 256 generates image data with graphical elements placed and configured to be consistent with the virtual model.

In embodiments where the graphical elements are to be displayed on the HUD system 150, the configurations of the graphical elements must be adjusted to account for the different in the location or perspective of the driver and the image capturing device 110. Because the location of the image capturing device 110 and the driver's eye location are known, adjustments of coordinate and change in perspective may be performed using, for example, OpenGL application programming interface (API).

In other embodiment where the images are displayed on a display device installed in the dashboard or center console of the vehicle or the difference in the location of the driver and the image capturing device 110 can be ignored, the graphical elements can be overlaid on the image captured by the image capturing device 110 directly for display without adjusting for the difference in the locations of the image capturing device 110 and the driver.

Figure 6:
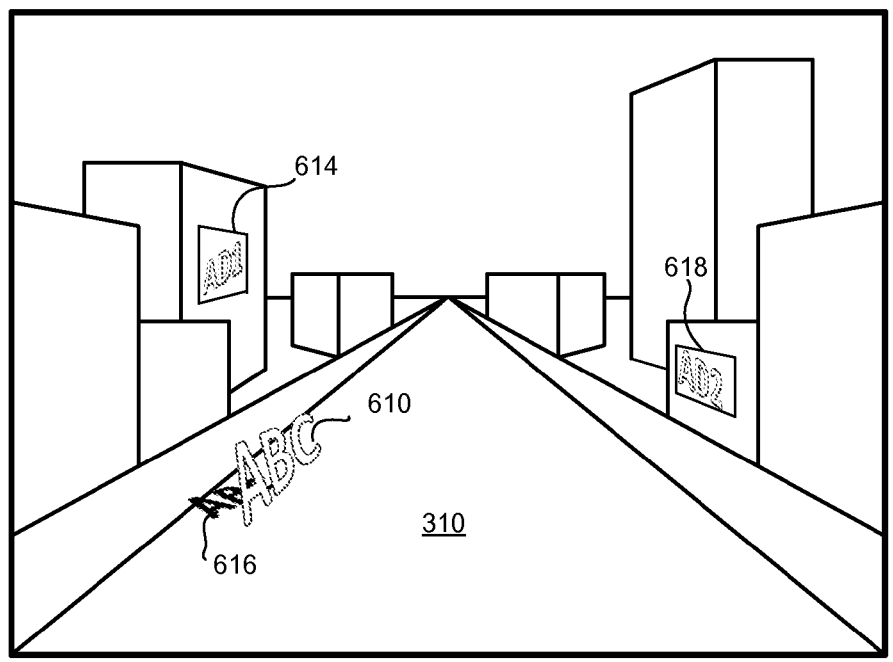
FIG. 6 is an image of augmented reality including graphical elements displayed on a display device in a vehicle, according to one embodiment.

FIG. 6 is an image of augmented reality including graphical elements 610, 614, 616, 618 displayed on a display device in a vehicle. The image in FIG. 6 may be seen from a windshield of the vehicle where the graphical elements 614, 610, 616, 618 are projected from a projector of the HUD system 150. Alternatively, the image in FIG. 6 may be presented on a display device in a dashboard or center console of the vehicle.

Each of boxes 614, 618 are affixed to a left side wall or a right side wall of the virtual model to display advertisements or other information. The advertisements may be static images or dynamic moving pictures. A message 610 and its shadow 616 may also be shown on the road 318. The message 610 is configured for placement on the floor of the virtual model corresponding to the environment in front of the vehicle. The message 610 may indicate, for example, the name of a point of interest (POI) and warning signals on driving conditions. Shadows (e.g. shadow 161) are also displayed to enhance the realism of the augmented reality. The configuration of shadows may be determined using the positioning information 116 and the time information 148, as described below in detail.

As described above with reference to FIG. 5, the graphical elements 610, 614, 616, 618 are moved and changed with the movement of the vehicle. Specifically, the boxes 614, 618 move and change their dimensions as if the boxes 614, 618 are secured to fixed locations of side walls of the virtual model. On the other hand, the message 610 and its shadow 616 move and changes their dimension as if they are secured to a floor of the virtual model.

FIG. 7 is an image of augmented reality including graphical elements 712, 716, 720, 724 displayed while the vehicle is stopped at an intersection, according to one embodiment. At the intersection, a trench virtual model that was generated immediately prior to reaching the intersection may be place the graphical elements 712, 716, 720, 724. Alternatively, a new virtual model representing an intersection may be generated for placement of the graphical elements 712, 716, 720, 724.

In the example of FIG. 7, the vehicle detected a stop signal by using captured images including a traffic signal 752 or by receiving information via vehicle-to-infrastructure (V2I) communication. In response to detection of "stop" signal by the vehicle, a stop sign 716 is generated for display on the HUD system 150 or other display devices in the vehicle. The stop sign 716 is a graphical element and acting as if it is affixed to a ceiling of the virtual model. The stop sign 716 may change to a "go" sign (not shown) when the traffic signal 752 changes. Such a change may be prompted by the captured image indicating change of the traffic signal (though image processing) or information received via V2I communication.

While the vehicle is stopped, graphical elements such as advertisement 712 may be generated for presentation to the driver. The advertisement 712 is configured to act as if it is displayed on a billboard secured to the floor of the virtual model. The advertisement 712 may disappear once the vehicle starts moving or once the traffic signal 752 changes. A shadow 714 of the billboard may also be generated to add realism to the advertisement 712. By presenting the advertisement 712 while the vehicle is stopped by a traffic signal, distraction to the driver is reduced while keeping the driver entertained or informed.

FIG. 7 also illustrates a virtual three dimensional graphical element 724 displayed on the road. The graphical element 724 is in the form of a robot but graphical element 724 of various other forms may also be used. In this example, the graphical element 724 is assisting the driver navigate to a destination by pointing a finger to make a right turn at the intersection. The graphical element 724 is affixed to the floor of the virtual model. Address signpost 720 is also displayed to assist the driver navigate to the destination. The signpost 720 may be affixed to a sidewall or the ceiling of the virtual model.

Shadows of graphical elements may be generated by detecting the geographical location of the vehicle using real-time GPS information received as part of the positioning information 116. Using the GPS information and time information 148, the location of the sun relative to the vehicle can be determined in real-time. Treating the sun as a direction light source and using surfaces of the virtual model as planes onto which shadows of the graphical elements are projected, the shadows may be generated in an expedient manner.

Graphical elements and their configurations in FIGS. 6 and 7 are merely illustrative. Various other graphical elements of different configuration may be used to provide various types of visual information to the driver.

Virtual Crosswalk

Various safety features may be implemented using the virtual model generated from the captured images. One of many such features is a virtual crosswalk generated to indicate a path that a pedestrian may take to cross a road. Pedestrians may sometime jaywalk a road, creating safety hazard for vehicles. In one embodiment, a pedestrian likely to jaywalk a road is automatically detected based on captured images, and then a graphical element similar to a crosswalk is displayed to warn the driver.

In one embodiment, the image capturing device 110 includes a stereoscopic camera. By processing images captured by the stereoscopic camera, the pose of a pedestrian and the distance to the pedestrian may be determined. The pedestrian detector 242 determines whether a pedestrian is likely to cross the road based on actions such as facing the road, walking towards the road, holding up his arm or a combination of these actions. After the pedestrian detector 242 determines that a pedestrian is likely to cross the road, the pedestrian detector 242 sends the pedestrian information 246 indicating the location of the pedestrian to the graphical element generator 252.

Figure 8A:
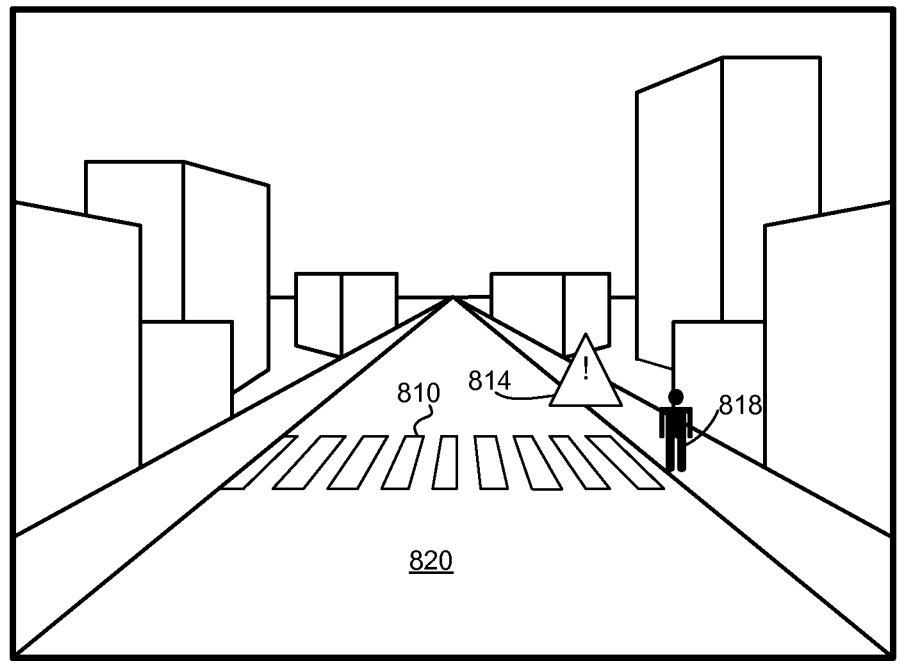
FIG. 8A is an image of augmented reality showing virtual crosswalk at a first distance from a pedestrian, according to one embodiment.
Figure 8B:
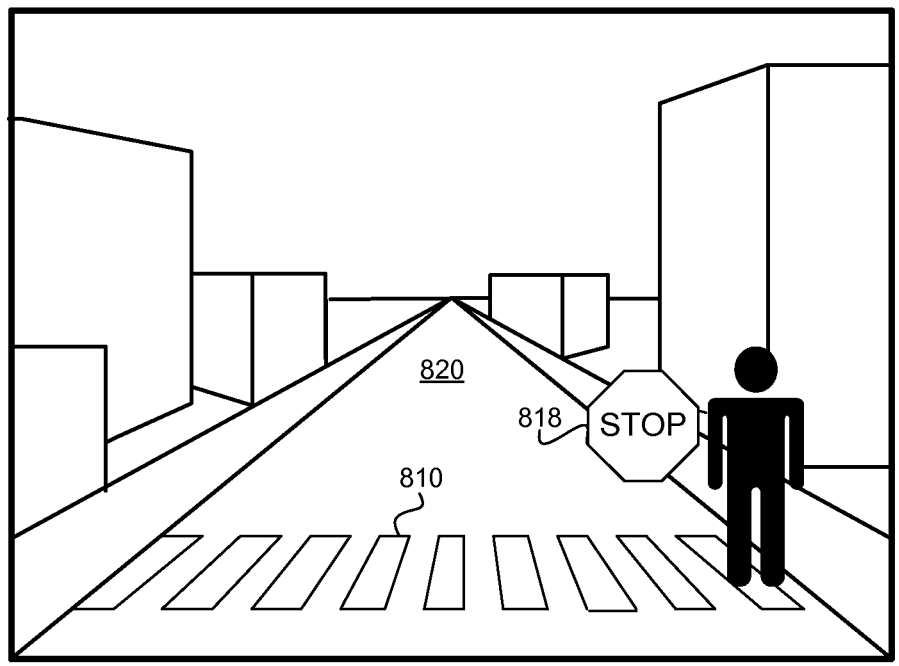
FIG. 8B is an image of augmented reality showing virtual crosswalk at a second distance from the pedestrian, according to one embodiment.

Based on the pedestrian information 246, the graphical element generator 252 generates a graphical element representing a crosswalk 810 for pedestrian 818, as illustrated in FIG. 8A. The crosswalk 810 extends across road 820 from the part of the road closest to the pedestrian 818. In addition, the graphical element generator 852 may generate a graphical element 814 representing a warning signal to indicate that the pedestrian 818 is likely to start crossing the road 820.

The distance to the pedestrian 818 may be determined by processing the stereoscopic image captured by the image capturing device 110. As the vehicle comes closer to the pedestrian 818, the graphical element 814 changes to a stop signal 818 as illustrated in FIG. 8A to prompt higher cautionary measure from the driver.

The crosswalk 810 is a graphical element affixed to the floor of the virtual model while the graphical elements 814, 818 are graphical elements affixed to the right side wall of the virtual model. Because these graphical elements move in conjunction with the change in scenery, the graphical elements cause less distraction to the driver while alerting the driver of the possible risk factors.

Example Method of Displaying Graphical Elements

Figure 9:
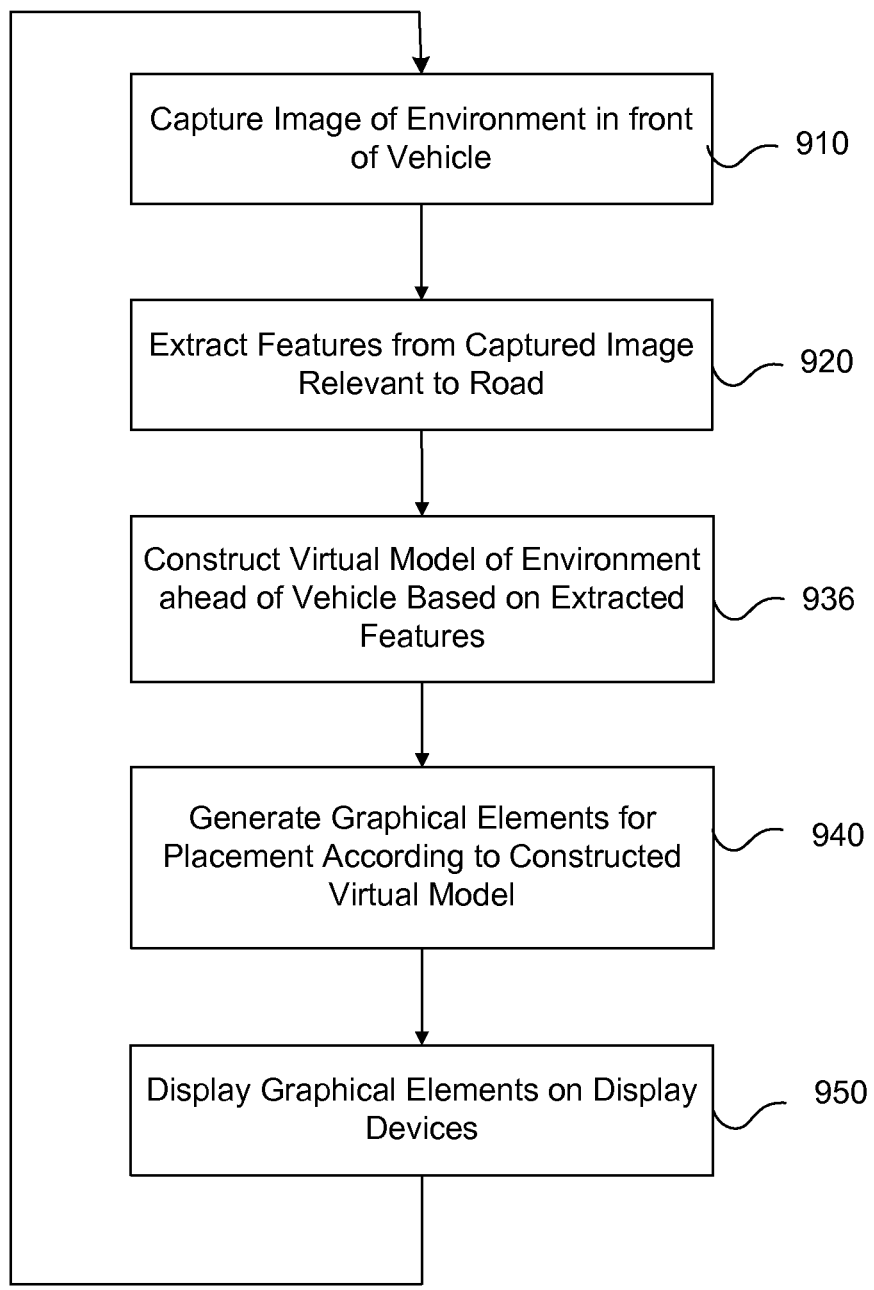
FIG. 9 is a flowchart illustrating a method of generating graphical elements for augmented reality, according to one embodiment.

FIG. 9 is a flowchart illustrating a method of generating graphical elements for augmented reality, according to one embodiment. First, an image of the environment in front of a vehicle is captured 910 using an image capturing device 110. The captured image 112 is then preprocessed and sent to the augmented reality processor 140.

The augmented reality processor 140 extracts 920 features relevant to a road from the captured image (or preprocessed image). For this purpose, the augmented reality processor 140 may crop images and retain a portion of the captured image suitable for extracting the features. Further, IPM algorithm may be applied to the cropped image to facilitate extraction of relevant features. The features may be extracted, for example, using a separable filter, Hough transform or other applicable filters. In one embodiment, the extracted features include lines corresponding to edges of the road.

Based on the extracted features, a virtual model of the environment in front of the vehicle is constructed 936. The virtual model includes one or more surfaces to which the location and configuration of the graphical elements can be referenced. For example, the graphical elements may be placed on the surface, extended from a surface or placed on the surface.

The graphical elements are then generated 940 for placement according to the virtual model. The graphical elements may be generated based on information from external sources or information generated in the vehicle (e.g., pedestrian information 246). After the graphical elements are generated, the configurations of the graphical elements are adjusted for placement with reference to surfaces in the virtual model. The configurations of the graphical elements may include tilting angles, sizes and orientations of the graphical elements.

The generated graphical elements are then displayed 950 on the display device (e.g., the HUD system 150). Then, the process returns to capturing 910 a subsequent image and repeats the subsequent processes.

The steps and their sequences in FIG. 9 are merely illustrative. For example, a step of detecting the position of the vehicle may be added to generate shadows of graphical elements.

Alternative or Additional Embodiments

In one embodiment, the positioning information 116 including GPS information and the heading of the vehicle may be used to assist in generation of the virtual model. The GPS information and the heading of the vehicle may be used to determine the portion of road on which the vehicle is traveling in a map or a satellite image. Based on the map or the satellite image, the orientation and width of the road may be verified against the bird's eye view (e.g., FIG. 4A or 4B). Adjustments may be made to the bird's eye view before constructing a virtual model of the environment.

In one embodiment, instead of generating virtual models for the entire length of the road visible in the captured image, only a portion of the road close to the vehicle may be used to generate a virtual model. Taking the example of FIG. 4C, a virtual model for only segment 426 is generated. The segment 426 may be continuously updated with the progress of time and vehicle.

In one embodiment, color information of roads is used instead of or in addition to extracting line features in the captured image. Roads generally have grayish to black color. Using such characteristic of the road, pixels in an image having color values within a predefined color space and contiguous region of the image may be selected to represent the road. Detection of roads using color information may be especially useful in intersections. The arrangements of pixels may then be analyzed to determine the configuration of the road ahead of the vehicle.

Although several embodiments are described above, various modifications can be made within the scope of the present disclosure.

The invention claimed is:

1. A method, comprising:
   capturing an image by an image capturing device in a vehicle;
   detecting visual features in the image indicative of a position of a road relative of the vehicle by at least:
      cropping the captured image to extract a portion of image including outline of a road,
      performing inverse perspective mapping on the cropped image to generate a bird's eye view image,
      using a separable filter on the bird's eye view image to generate a filtered image,
      detecting line features representing edges of the road from the filtered image, and
      fitting curves onto the detected line features;
   constructing a virtual model of environment in front of the vehicle based on the detected visual features, the virtual model including at least one surface;
   generating graphical elements to convey information on a display device in the vehicle;
   configuring the generated graphical elements with reference to the at least one surface of the virtual model; and
   displaying the configured graphical elements on the display device.

2. The method of claim 1, wherein the display device is a heads-up display device projecting the graphical elements on a windshield of the vehicle.

3. The method of claim 1, wherein the virtual model represents a trench including a left wall, a right wall, a floor and a ceiling.

4. The method of claim 1, wherein the configured graphical elements move in conjunction with the at least one surface to generate an appearance that the configured graphical elements are fixed to the at least one surface.

5. The method of claim 1, wherein generating the graphical elements comprises:
   determining location and heading of the vehicle; and
   retrieving information from an information source based on the location or heading of the vehicle.

6. The method of claim 5, wherein generating the graphical elements further comprises using a profile of a user and the location or heading of the vehicle to generate the graphical elements.

7. The method of claim 1, further comprising:
   determining heading and location of the vehicle,
   determining current time;
   determining location of sun relative to the vehicle based on the determined current time, the determined heading and the determined location;
   generating shadows of at least one of the configured graphical elements based on the location of the sun; and
   displaying the shadows on the display device.

8. The method of claim 1, further comprising:
   detecting a pedestrian likely to cross the road in front of the vehicle; and
   generating a graphical element representing a crosswalk at a portion of the road across which the pedestrian is likely to cross the road.

9. An augmented reality system comprising:
   an image capturing device installed in a vehicle to capture an image comprising a road in front of the vehicle;
   an image feature detector coupled to the image capturing device and configured to detect visual features in the image indicative of a position of a road relative to the vehicle by at least:
      cropping the captured image to extract a portion of image including outline of a road; and
      performing inverse perspective mapping on the cropped image to generate a bird's eye view image,
      using a separable filtering on the bird's eye view image to generate a filtered image, detecting line features representing edges of the road image from the filtered image, and fitting curves onto the detected line features; and a model generator coupled to the image feature detector and configured to construct a virtual model of environment in front of the vehicle based on the visual features, the virtual model including at least one surface;

a graphical element generator configured to graphical elements to convey information;

a graphical image renderer configured to set configurations of the generated graphical elements with reference to the at least one surface of the virtual model; and a display device coupled to the graphical image renderer and configured to display the generated graphical elements according to the set configurations.

10. The system of claim 9, wherein the display device is a heads-up display device projecting the graphical elements on a windshield of the vehicle.

11. The system of claim 9, wherein the virtual model represents a trench including a left wall, a right wall, a floor and a ceiling.

12. The system of claim 9, wherein the configurations of the graphical elements are set to move the graphical elements in conjunction with the at least one surface to generate an appearance that the graphical elements are fixed to the at least one surface.

13. The system of claim 9, wherein the graphical element generator is configured to:

determine location and heading of the vehicle; and retrieve information from an information source based on the location or heading of the vehicle.

14. The system of claim 9, further comprising an environment state analyzer configured to:

determine location of sun based on the determined current time, the determined heading and the determined location; and generate shadows of at least one of the configured graphical elements based on the location of the sun for display on the display device.

15. The system of claim 9, further comprising a pedestrian detector configured to detect a pedestrian likely to cross the road in front of the vehicle, and wherein the graphical elements generator is further configured to generate a graphical element representing a crosswalk at a portion of the road across which the pedestrian is likely to cross the road.

16. A non-transitory computer-readable storage medium storing instructions thereon, the instructions when executed by a processor causes the processor to:

detect visual features in an image indicative of a position of a road relative to the vehicle, the image captured by an image capturing device in the vehicle by at least:

cropping the captured image to extract a portion of image including outline of a road, performing inverse perspective mapping on the cropped image to generate a bird's eye view image, using a separable filter on the bird's eye view image to generate a filtered image, detecting line features representing edges of the road from the filtered image, and fitting curves onto the detected line features;

construct a virtual model of environment in front of the vehicle based on the visual features, the virtual model including at least one surface;

generate graphical elements to convey information on a display device in the vehicle;

configure the generated graphical elements with reference to the at least one surface of the virtual model; and display the configured graphical elements on the display device.

* * * * *